INVENTOR.
HERMAN J. TROCHE
BY Bates, Teare & McBean
ATTORNEYS

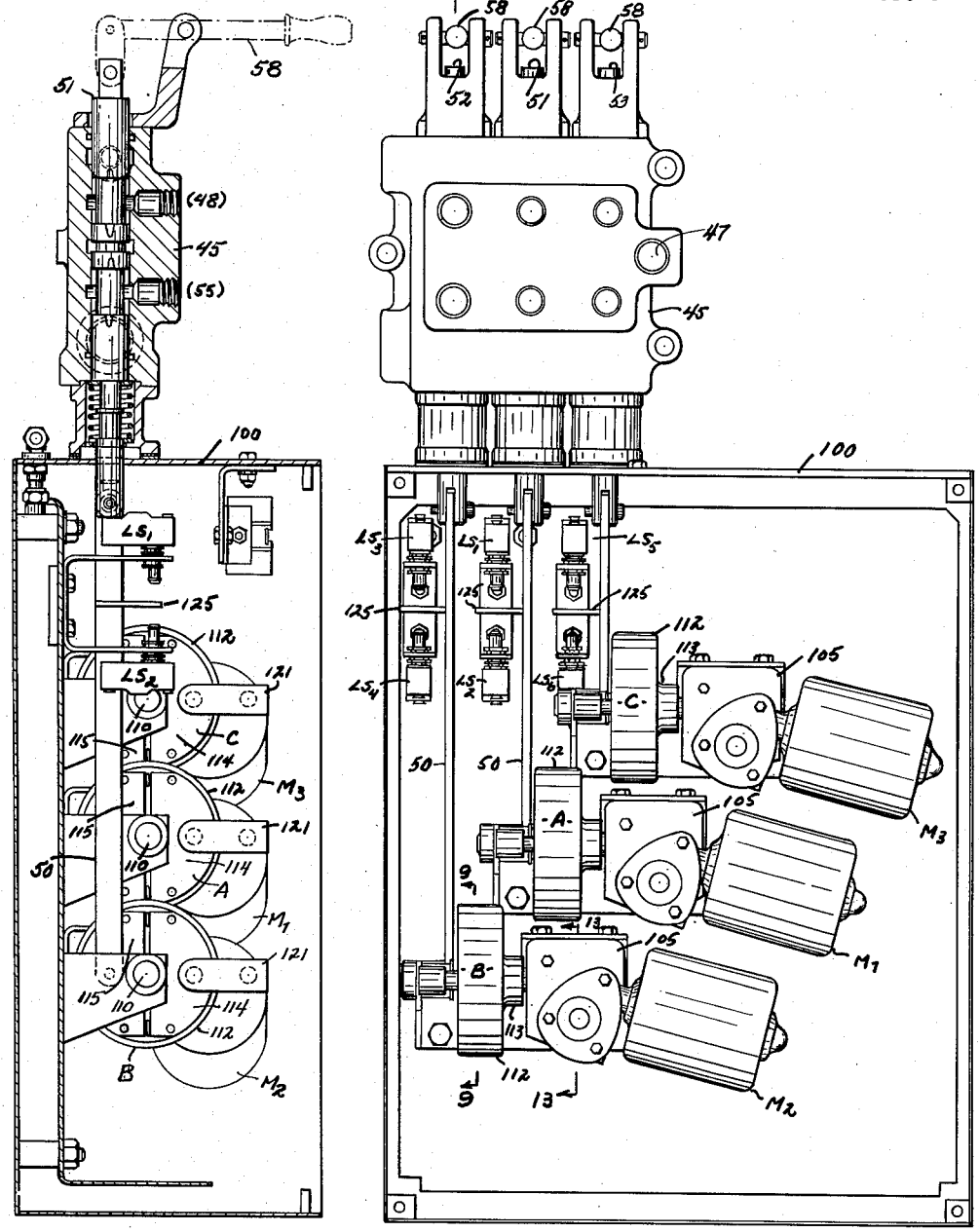

April 4, 1961  H. J. TROCHE  2,977,769
CONTROL FOR MOBILE AERIAL TOWER
Filed July 9, 1956  5 Sheets-Sheet 4

INVENTOR.
HERMAN J. TROCHE
BY
ATTORNEYS

April 4, 1961  H. J. TROCHE  2,977,769
CONTROL FOR MOBILE AERIAL TOWER
Filed July 9, 1956  5 Sheets-Sheet 5

INVENTOR.
HERMAN J. TROCHE
BY Bates, Teare & McStan
ATTORNEYS

United States Patent Office 2,977,769
Patented Apr. 4, 1961

2,977,769
CONTROL FOR MOBILE AERIAL TOWER

Herman J. Troche, Fairview Park, Ohio, assignor to J. H. Holan Corporation, Cleveland, Ohio, a corporation of Ohio Filed July 9, 1956, Ser. No. 596,626

8 Claims. (Cl. 60—97)

This invention relates generally to a control system for a mobile aerial tower which can be operated to position a work platform to any selected horizontal or vertical angle at various extended distances to provide access to overhead traffic lights, street lamps and similar objects for installation, maintenance and repair. The invention relates more particularly to an electrically actuated fluid control system for selectively causing the various movements of the tower under the direct control of a workman located on the work platform.

The operative elements of a fluid control system for positioning the mobile tower are preferably located adjacent the base of the tower. The elements are remotely actuated by a pilot-control on the work platform and are under the direct control of a workman on the platform. The pilot-control may be an integral part of the fluid system and may be interconnected with the operative elements of the fluid system by extending the fluid lines up through the movable portions of the tower. However, such extension of the fluid lines through the tower assembly render them susceptible to breakage or fracture. Accordingly, it is a principal object of this invention to eliminate this danger by providing a remotely located pilot-control for the fluid system which does not require the extension of fluid lines through the movable portions of the tower.

Another object of this invention relates to the provision of an improved arrangement for translating an electrical pilot control signal into a corresponding fluid controlled tower movement.

A further object of this invention relates to the provision of a self-contained manually operated device for selectively energizing an electrical pilot-control to activate a fluid operated tower control system directly from the tower.

Briefly, in accordance with this invention, the collapsible tower assembly includes a plurality of tower sections pivotally connected together in end to end relation on top of a rotatable mast mounted on a utility vehicle in such manner that the entire tower assembly may be rotated in a horizontal plane while each of its sections may be independently tilted in a vertical plane to provide a mobile tower which is capable of substantially universal movement for unlimited access to any selected work area within its range. Movement of the mast and tower sections is accomplished by selectively actuating fluid motors which are remotely controlled from the work platform. The fluid control system is continuously active on a stand-by basis, whereby one or more of the fluid motors may be operated by a workman on the platform to provide individual or compound movement of the tower sections and mast. The improved pilot-control includes an electrical control circuit having a self-contained manually operated control device remotely located on the work platform for selectively energizing the circuit and including translating devices for converting electrical control signals into corresponding fluid control signals in the fluid system. The operative elements of the fluid control system are preferably located adjacent the base of the tower and they include an auxiliary arrangement for independently controlling movement of the tower members in case of emergency or special circumstances.

In the drawings:

Fig. 1 is a perspective view of the utility vehicle carrying a mobile aerial tower with different positions of the tower shown in dotted lines;

Fig. 2 schematically illustrates the electrical pilot-control circuit and diagrammatically illustrates the fluid control system and the coupling therebetween;

Fig. 3 is a plan view of the distributor valve assembly operative in the system;

Fig. 4 is a sectional view taken along the line 4—4 in Fig. 3 of the drawings;

Figure 10:
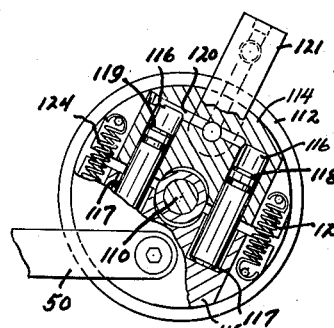
Figure 11:
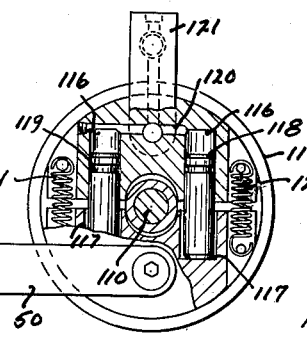
Figure 12:
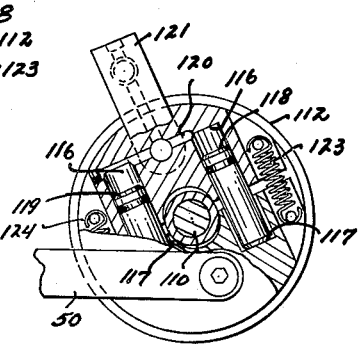
Figure 9:
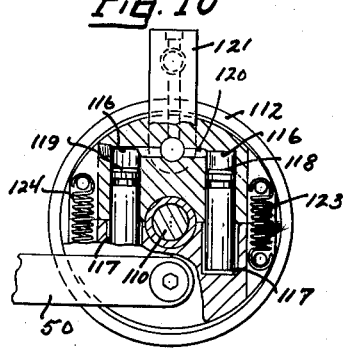
Fig. 9 is a sectional view taken along the lines 9—9 in Fig. 3 of the drawings to illustrate the details of a fluid-actuated clutch which applies an electrically actuated control signal to position the valve spools of the distributor valve.
Figure 13:
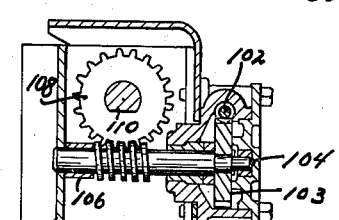

Figs. 10, 11 and 12 respectively illustrate different operative positions of the clutch assembly of Fig. 9; and Fig. 13 of the drawings is an enlarged sectional view taken along the lines 13—13 in Fig. 3 to illustrate the interior details of a gear reduction arrangement for applying controlled movement to the driving portion of the fluid actuated clutch.

Figure 1:
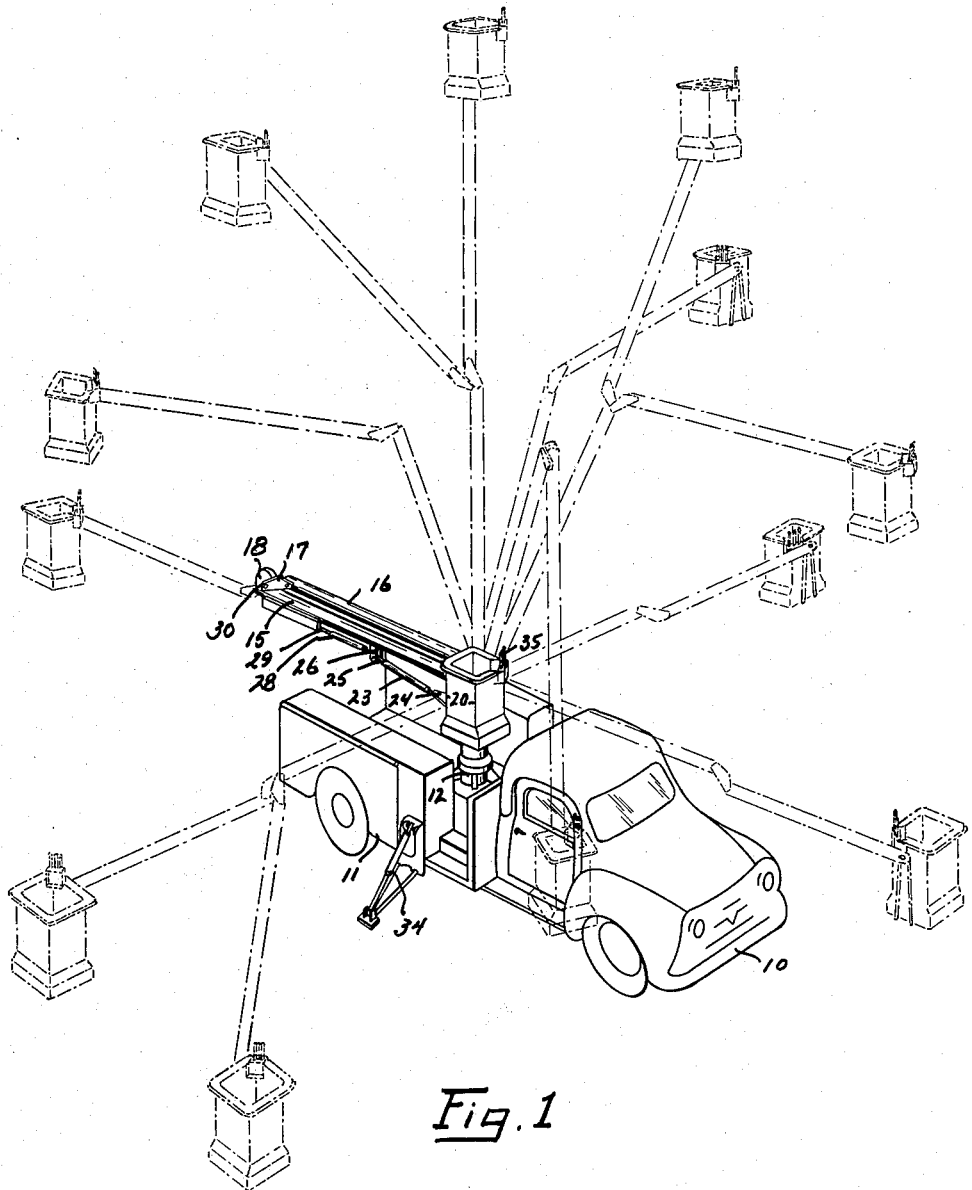
Figures 5, 6:
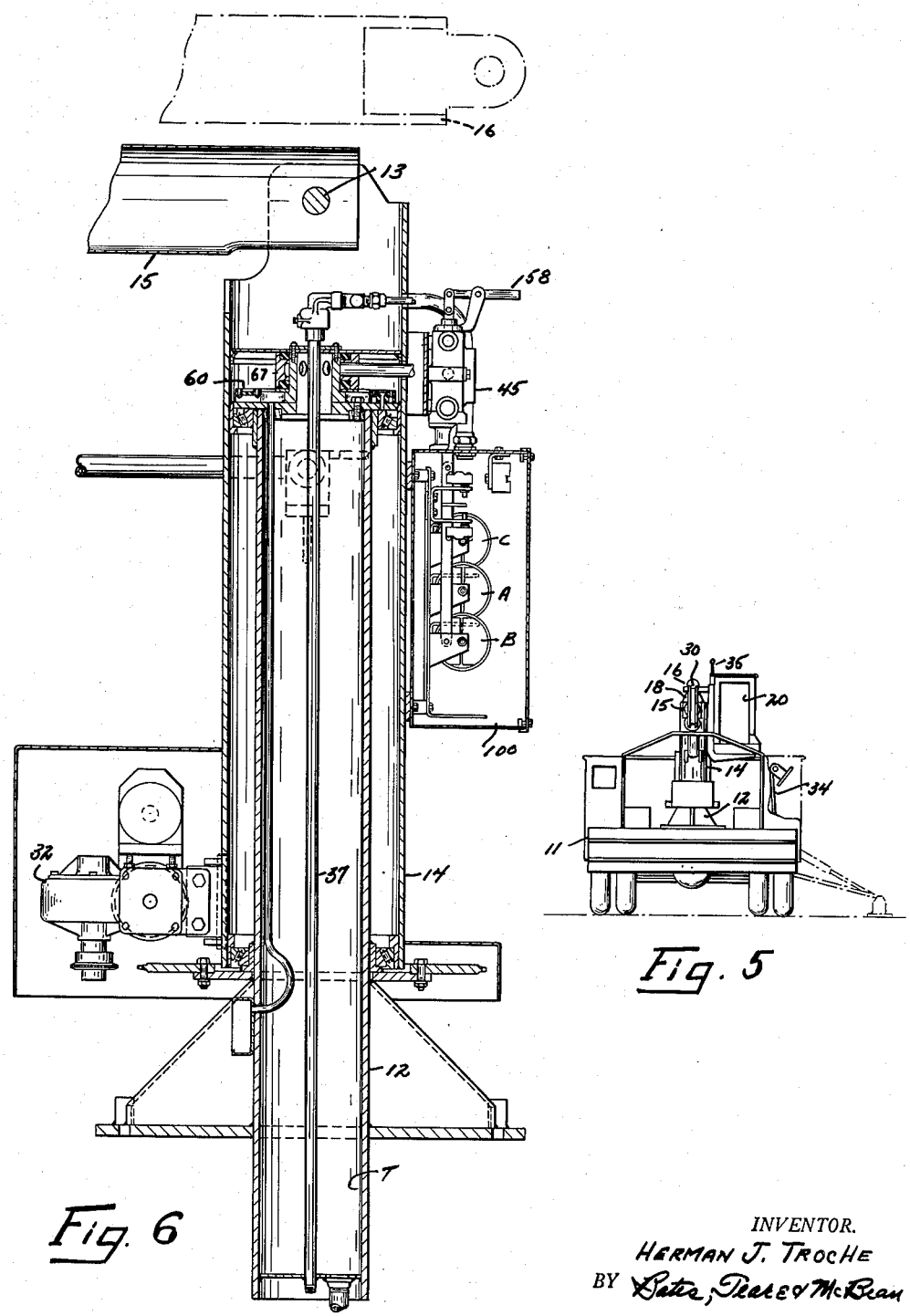
Fig. 5 is a rear view of a utility vehicle illustrating the disposition of the mast and tower assembly on the vehicle body.
Fig. 6 is an enlarged vertical sectional view of the tower mast assembly.

With particular reference to Figs. 1 and 5 of the drawings, there is shown a wheeled utility vehicle 10 having a truck body 11 which carries a vertical mast 12, the upper portion 14 of which is rotatable through 360° and supports a collapsible tower assembly at its upper extremity. The collapsible tower assembly includes a pair of tower sections 15 and 16 pivotally interconnected in end to end relation through the saddle member 17 and carries a work platform 20 at its upper extremity. The lower tower section 15 is pivotally connected at 13 to the upper extremity 14 of the rotatable mast for tilting movement in a vertical plane. The pivotal interconnection 17 between the upper and lower tower sections is such that the upper section 16 is pivotal in a vertical plane relative to the lower section 15. The work platform 20 is in the form of an enclosed box-like structure which is pivotally supported in cantilever fashion from the upper extremity of the upper tower section 16 so that as the tower sections 15 and 16 are tilted in a vertical plane the work platform 20 can be maintained level for any tilted position of the tower sections.

The lower tower section 15 is tilted by means of a fluid actuated piston motor 22 whose cylinder 23 is anchored to a bracket 24 carried by the rotatable portion 14 of the mast and whose piston rod 25 is pivotally connected at its external extremity to a bracket 26 mounted intermediate the ends of the lower tower section 15. The upper tower section 16 is tilted in similar fashion by means of a fluid actuated piston motor 27 whose cylinder 28 is pivotally connected to the bracket 26 and whose piston rod 29 has a flexible link connection 30 extending about an arcuate guide member 18 on the lower tower section 15 and connected at its opposite extremity to the upper tower section 16 in such manner that retraction of the piston rod 29 within the cylinder 28 will cause the upper tower section 16 to swing in a vertical plane. The upper portion 14 of the mast is rotated by means of fluid actuated motor 32 which has a suitable driving connection with the upper portion 14 of the mast in a manner to be hereinafter more fully described.

Retractable fluid actuated jacks 34 extend outwardly from the sides of the vehicle body 11 to engage the ground surface and thereby anchor the vehicle body in a stationary position to insure stability during movement of the tower sections and the mast. The jacks 34 may be extended and retracted in any suitable manner, as for example, by fluid actuated motors which may be coupled to a source of operating fluid in a conventional manner. The universality of movement of the work platform 20 relative to the supporting vehicle body 11 provides virtually unlimited access to any point relative to the anchored vehicle and within the dimensional limits of its structural members.

Figure 2:
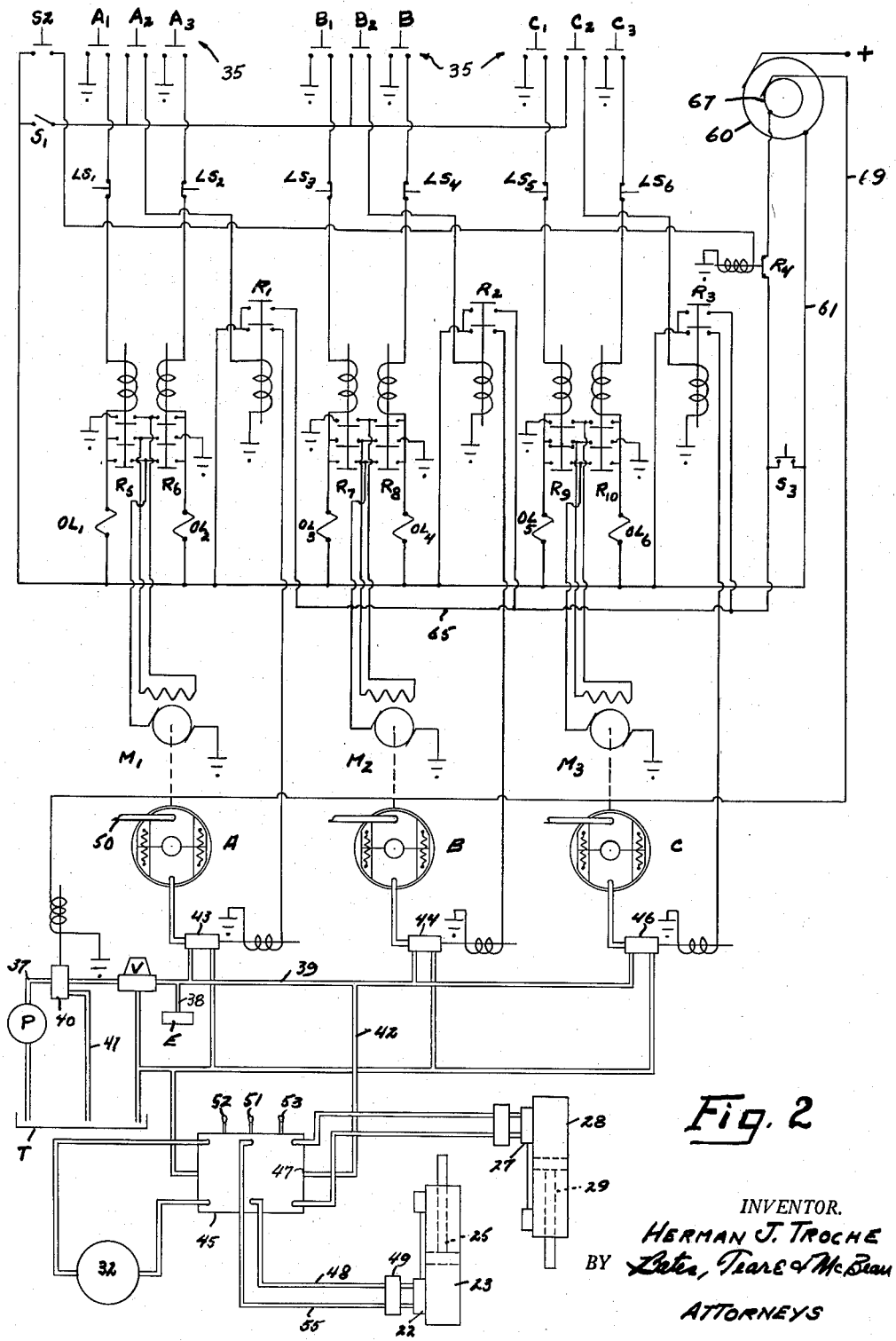

Controlled operation of the collapsible tower assembly to present the work platform 20 to any desired work location is accomplished by selectively supplying operating fluid to each of the fluid motors 22, 27 or 32 through a control system which is diagrammatically illustrated in a portion of Fig. 2 of the drawings. The control system is pilot actuated by a self-contained manually operated control device 35 which is remotely located on the work platform 20 so that the workman can operate and relocate the platform at will from his station on the platform. The pilot-control portion of the system is in the form of an electrical control circuit schematically shown in Fig. 2 of the drawing which is selectively energized by the control device 35 to activate solenoid controlled valves in the fluid system. The operative elements of the fluid system including the fluid lines are preferably located adjacent the base of the tower assembly and the only operative portions of the system that extend up to the movable sections of the tower are electrical wires and cables which are not as easily subject to fracture and damage. However, for ease of illustration, the electrical wires and cables are not shown in detail in Figs. 1 and 5; it being understood that such wires and cables, which are schematically shown in the control system of Fig. 2, can be supported on the tower assembly in any suitable and convenient manner.

Referring now more particularly to Fig. 2 of the drawings, operating fluid is supplied to the fluid system from a variable output pump P which, in its preferred form is carried below the vehicle body and is coupled to a power takeoff from the drive shaft of the vehicle transmission and adapted to pump operating fluid from a reservoir T which is formed by the hollow interior of the stationary portion of the mast 12 as best shown in Fig. 6 of the drawings. The variable output of the pump P varies from a low pressure when idling to a high pressure when driven at a higher speed. The pump is preferably pilot-controlled and of conventional design having internal ports and spring regulated valves for controlling the variable output. The output of the pump is continuously supplied through a line 37 to a conventional solenoid operated by-pass valve 40 which, in its normally opened position, by-passes the operating fluid through line 41 to the reservoir. When closed, the valve 40 passes the operating fluid through a pressure relief valve V and line 42 to the main inlet port of a distributor valve 45. The distributor valve 45 is a closed center type wherein the valve spools are selectively positioned by means of electrical motors in a manner to be hereinafter more fully described in connection with Figs. 3 and 4 of the drawings to distribute the operating fluid through various outlet ports in the valve body for selective application to one or more of the fluid motors. A branch line 38 supplies operating fluid to a throttle control device E which is attached to the truck motor carburetor, causing the motor to speed up to a pre-set speed which corresponds to a predetermined high operating pressure. Another line 39 supplies operating fluid to the inlet fittings of fluid actuated clutches A, B and C through normally closed conventional solenoid actuated valves 43, 44 and 46 respectively which are actuated in response to selective energization of the pilot control circuit in a manner to be hereinafter more fully described. The supply lines 38 and 39 leading to the throttle control E and the clutches A, B and C are dead-ended at these members so that the flow of fluid in the system is only that required to actuate them. Since all other outlet passages in the system are closed, the relief valve V will maintain the operating fluid in the system at a pre-set operating pressure, automatically returning excess fluid to the reservoir.

Referring now to Figs. 3 and 4 in conjunction with Fig. 2, when the pilot-control circuit is energized to activate a selected one of the solenoid actuated valves, as for example the valve 43, operating fluid is supplied to the inlet fitting of the corresponding clutch A and the clutch assembly operates through a connecting link 50 to transmit power from an electrical motor $M_1$ and to axially position a valve spool 51 of the distributor valve 45 which directs operating fluid from the inlet port 47 of the distributor valve 45 through a line 48 and a suitable pilot check valve 49 to one end of the corresponding motor cylinder 23, thereby causing the motor piston 25 to move the corresponding tower section. Movement of the piston 25 displaces fluid in the opposite end of the cylinder 23 and returns such fluid through the pilot check valve 49 and through the distributor valve 45 to the reservoir. The pilot check valve may be any conventional type which operates to prevent escape of operating fluid from either end of the cylinder 23 when it is in a static condition, thus preventing erratic movement or drift. Reverse movement of the motor piston 25 is accomplished by reversing the direction of the motor $M_1$ and hence rotation of the clutch assembly which positions the distributor valve spool 51 in the opposite direction to transmit the operating fluid through the line 55 and thence through the check valve 49 to the opposite end of the cylinder 23. The clutches B and C operate in a similar manner when activated to apply the driving force from motors $M_2$ and $M_3$ to position the valve spools 52 and 53 and thereby supply operating fluid to the fluid motors 27 and 32 respectively. Thus, each of the fluid motors 22, 27 or 32 may be independently actuated in a similar manner by selective energization of the corresponding portion of the control circuit, or they may be actuated together in various combinations to accomplish a compound movement of the tower assembly sections by multiple energization of the corresponding portions of the pilot control circuit in a manner to be hereinafter more fully described.

Referring now more particularly to the schematic representation of the pilot control circuit in Fig. 2, it is seen that the control circuit includes a plurality of switches $A_{1-3}$, $B_{1-3}$ and $C_{1-3}$ which can be selectively closed by the control device 35 to actuate corresponding solenoid actuated valves in the fluid portion of the system. A suitable source of direct current potential is coupled to the control circuit through a collector ring 60 which may be carried by the rotatable portion 14 of the mast 12 to transmit electrical current from a stationary source on the vehicle through the conductor 61 and a main line switch $S_1$ and thence to one pole of each of the normally open control switches $A_2$, $B_2$ and $C_2$. The other pole of each control switch is connected respectively through a corresponding double relay $R_1$, $R_2$ and $R_3$ to ground so that when any control switch is depressed, its relay is actuated to apply an energizing potential through one set of contacts to the corresponding solenoid actuated valve to supply operating fluid to the corresponding clutch assembly; thus activating the clutch and conditioning the distributor valve 45 for movement of the corresponding valve spool upon energization of the corresponding drive motor $M_1$, $M_2$ or $M_3$. The other set of contacts of each double relay is connected to a return conductor 65 which passes through a safety relay switch $R_4$ through another collector ring 67 to the conductor 69 which supplies an energizing potential to the coil of the solenoid actuated valve 40, so that the operating fluid, which heretofore has been circulating freely through the by-pass path 41, is now free to pass through the pressure relief valve V, to the throttle control E and through the lines 39 and 42 to the inlet port of the distributor valve 45.

Each distributor valve spool 51, 52 and 53 is selectively positioned by respectively energizing the corresponding drive motor $M_1$, $M_2$ or $M_3$ which operates through the corresponding fluid activated clutch assembly to move its valve spool axially to distribute operating fluid to the corresponding fluid motor.

The drive motors $M_1$, $M_2$ and $M_3$ are actuated by closing one or the other of the corresponding motor switches $A_1$ or $A_3$, $B_1$ or $B_3$, $C_1$ or $C_3$, depending upon the direction of rotation desired. Each side of each motor energizing circuit includes respectively an overload switch $OL_1$ through $OL_6$ and a control relay $R_5$ through $R_{10}$ through which the energizing potential is supplied to the corresponding motor field and armature, the motor field being reversed in each branch of each motor energizing circuit. Each branch of the motor energizing circuits also respectively includes a suitable limit switch $LS_1$ through $LS_6$ which is physically located on the distributor valve body to limit the extent of movement of the corresponding valve spool in a manner to be hereinafter more fully described.

Thus, the length of time that any one of the motor control switches is closed governs the travel distance of the corresponding valve spool up to the limits controlled by the corresponding limit switches. Similarly, the length of time the motor switches are closed will determine the extent to which the distributor valve ports are opened and the speed at which the corresponding tower section travels in its movement. The entire operation can be terminated by opening the switches $A_2$, $B_2$ or $C_2$ in each branch of the control circuit, thereby causing the solenoid actuated valve 40 to open and allow fluid to by-pass to the reservoir while the system returns to a neutral or inactive condition, thus completing the cycle of operation. An emergency switch $S_2$ is provided in the energizing circuit of the safety relay $R_4$ which, when opened will energize the coil of the normally closed relay $R_4$ and deenergize the solenoid actuated valve 40 to cause the operating fluid to by-pass to the reservoir in a manner hereinbefore described.

In the preferred form, there is also provided an independent manual control for positioning the distributor valve spools from the vehicle body in case of special circumstances or in the event of an emergency. The manual control has lever-type handles such as 58 (dotted lines, Fig. 4) which are link-connected to an extended extremity of each of the distributor valve spools respectively so that each valve spool may be manually positioned in either direction to connect operating fluid to the corresponding fluid motor. In order to permit such independent manual manipulation of the valve spools it is necessary to isolate the pilot control circuit from the fluid system. This is accomplished by providing an electrical by-pass through a normally open switch $S_3$ which shunts the electrical current from the input conductor 61 to the return conductor 65 to energize the solenoid actuated valve 40 independently of the condition of the remainder of the control circuit. In operation, the drive motor and the clutch assemblies are normally inactive and the distributor valve spools are free to be positioned by means of the corresponding hand levers to direct operating fluid to the corresponding fluid motor as desired.

As hereinbefore indicated, the distributor valve spools 51, 52 or 53 may be positioned individually or in various combinations to accomplish individual or compound movements of the various operative components of the tower assembly by manual positioning of the hand levers 58, as hereinbefore noted, or by manipulation of the self-contained control device 35. In the preferred embodiment of this invention, the self-contained control device 35 is remotely located on the work platform 20 and includes the switches $A_{1-3}$, $B_{1-3}$ and $C_{1-3}$ which are enclosed in a suitable housing 70. A multiple conductor may be used to connect the switches from the housing 70 to the control relays, the solenoid actuated valves and the electric motors at the base of the tower.

Figure 7:
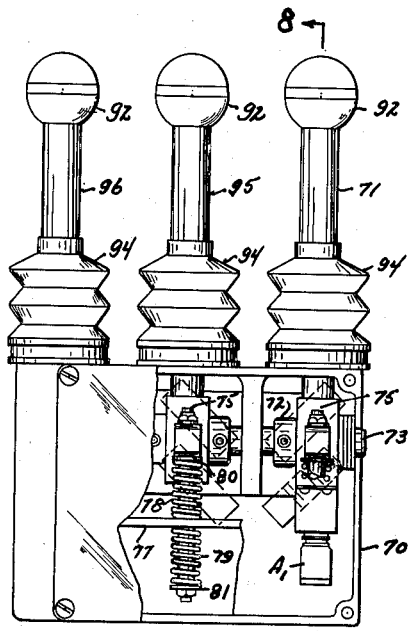
Fig. 7 is a side elevation of the self-contained manual control device with the interior partially exposed to illustrate the disposition of electrical control switches.
Figure 8:
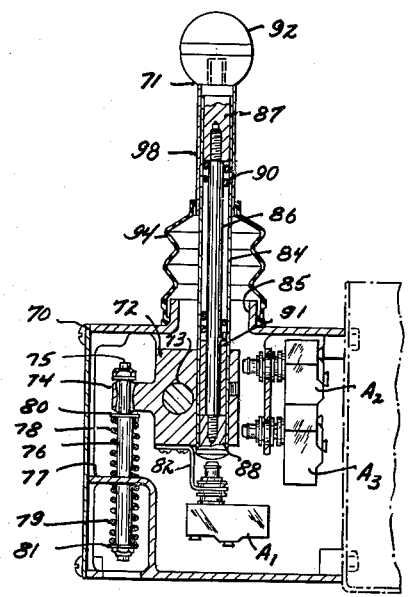
Fig. 8 is a sectional view taken along the lines 8—8 in Fig. 7 of the drawings.

The control device 35 is shown in greater detail in Figs. 7 and 8 of the drawings and, since the switches $A_{1-3}$ are identical to the switches $B_{1-3}$ and $C_{1-3}$, the description will be limited to $A_{1-3}$, it being understood that the description applies equally well to the B and C switches. Actually, each set of switch contacts $A_{1-3}$ is in the form of push-button micro-switch with $A_2$ and $A_3$ being mounted in side-by-side relation on the inside of the housing 70. A suitable lever-type handle 71 is carried by a rocker-arm assembly 72 which is keyed on a cross-shaft 73 whose extremities are rotatably journaled in opposite ends of the housing 70. Rotation of the assembly 72 by the handle 71 will cause it to engage one or the other of the push-button micro-switches $A_2$ or $A_3$, depending upon the direction of rotation. The rocker arm assembly 72 has an extension 74 which is anchored on a pin 75. The pin 75 extends through a sleeve 76 which slidably extends through an internal partition 77 of the housing 70. Suitable centering springs 78 and 79 encircle the sleeve 76 and coact between opposite sides of the partition 77 and heads 80 and 81 at opposite ends of the sleeve respectively to bias the rocker arm assembly 72 in a centered position out of engagement with either of the micro-switches $A_2$ and $A_3$.

The micro switch $A_1$ is mounted on a bracket 82 carried by the rocker arm assembly for engagement by the handle 71. The handle 71 is a composite member having a sleeve 84 fixed in the rocker arm assembly and extending upwardly through an opening 85 in the housing 70. A rod 86 carrying removable heads 87 and 88 at each end is slidably disposed in the sleeve 84 for axial reciprocation into and out of engagement with the micro switch $A_1$. A spring 90 coacts between the head 87 and an internal sleeve abutment 91 to bias the rod assembly out of engagement with $A_1$. The head 87 also carries a ball knob 92 at its outer extremity which limits the extent to which the rod assembly may be inserted into the sleeve 84. A suitable cylindrical skirt 93 extends downwardly from the knob 92, encircles the top of the sleeve 84 and is connected at its lower extremity to a flexible dust shroud 94 which encloses the opening 85.

In operation, the switch $A_1$ is closed by depressing the handle 71 to actuate the valve 40 and activate the fluid system, and the switches $A_2$ and $A_3$ are closed by tilting the handle 71 in either direction to energize the motor $M_1$ for rotation in either direction. Thus, the handle 71 must be depressed at all times to maintain operating pressure in the fluid system for movement of the tower sections. Manipulation of the other handles 95 and 96 will similarly actuate the switches $B_{1-3}$ and $C_{1-3}$ respectively to activate the control system as hereinbefore described.

As best shown in Figs. 3 and 4 of the drawings, the clutches A, B and C are assembled with the motors $M_1$, $M_2$ and $M_3$ within a housing 100 for operative coupling to the spools of the distributor valve 45; the valve casing being mounted on a side wall of the housing with the spools 51, 52 and 53 extending into the housing through openings in the side wall. The housing 100 may also be used to enclose the solenoid actuated valves and relays of the control system and the entire assembly may be supported on the upper portion 14 of the mast 12 as best shown in Fig. 6 of the drawings. Since the clutch and motor assemblies are identical, the description will be restricted to the clutch A and motor $M_1$; it being understood that this description is equally applicable to the other clutch and motor assemblies.

Referring now more particularly to Figs. 9 through 13 in conjunction with Figs. 3 and 4, the drive shaft 102 of the motor $M_1$ has a worm which engages a pinion 103 keyed on a spindle 104 within a gear box 105 (Fig. 13). The spindle 104 is journaled in a thrust bushing 106 which has a worm which engages a gear wheel 108 keyed on a drive shaft 110. The clutch A includes a drum 112 which has a hub 113 keyed on the drive shaft 110 external to the gear box 105. Disposed inside the drum 112 are a pair of clutch shoes 114 and 115, each having arcuate surfaces adapted to frictionally engage the internal periphery of the clutch drum when separated radially. Each clutch shoe has recesses 116 and 117 disposed transverse to the axis of the drive shaft 110 and adapted to receive and guide suitable pistons 118 and 119 therein. The clutch shoe 114 has fluid passageway 120 for supplying operating fluid from a fitting 121 to the pistons. The fitting 121 is in turn connected to the solenoid actuated valve 43 which controls the supply of operating fluid from the line 39 to the clutch pistons 118 and 119. The operating fluid positions the pistons to separate the clutch shoes 114 and 115 into driving engagement with the drum 112. Suitable springs 123 and 124 interconnect the clutch shoes on opposite sides of the drive shaft 110 and bias them in a non-engaging position (Fig. 9).

The clutch shoe 115 has a pivotal connection with one end of the link 50, the other end of the link being connected with the valve spool 51. Thus, when the clutch shoes 114 and 115 engage the clutch drum 112 (Figs. 10, 11 and 12), they will translate the rotation of the drive shaft 110 into a straight line motion of the valve spool 51 to control the flow of operating fluid through the corresponding ports of the distributor valve 45. As hereinbefore described the extent of movement of the valve spool 51 is controlled by the limit switches $LS_1$ and $LS_2$ which are disposed on opposite sides of a contact lever 125 carried by the link 50. The limit of movement in either direction is represented by the rotated positions of the clutch assembly in Figs. 10 and 12 of the drawings respectively.

Thus, there has been provided a collapsible mobile tower assembly having interconnected sections which are capable of controlled movement into any horizontal or vertical angle relative to a supporting base. The controlled movements are accomplished by selectively actuating fluid motors to provide individual or compound movement of the movable members of the tower assembly. Actuation of the fluid motors is accomplished by activating a fluid control system from a pilot control remotely located on a work platform carried by the mobile tower assembly. The pilot control includes a self-contained manually operated control device that selectively energizes an electrical control circuit which transmits the control signals to suitable translating devices for controlled application to the fluid control system. With this arrangement, the work platform can be smoothly and accurately positioned to any selected location within the dimensional range of the tower assembly and under the direct control of an operator on the platform. The pilot and control system is also provided with various protective and auxiliary safety controls which provide an overall optimum tower performance.

I have shown and described what I consider to be the preferred embodiments of my invention along with suggested modified forms, and it will be obvious to those skilled in the art that other changes and modifications can be made without departing from the scope of my invention as defined by the appended claims.

I claim:

1. In a multi-element aerial tower having a plurality of fluid actuated motors for independently moving the tower elements relative to each other, a control system comprising, a multi-stage distributing valve for selectively directing operating fluid to each of said motors, normally isolated electrically driven means for independently controlling the flow through each stage of the distributing valve means, normally inactive fluid actuated means for selectively applying said normally isolated electrically driven means to each stage, electro responsive valve means for selectively activating the normally inactive fluid actuated means for each stage of the distributing valve means, pilot controlled means for selectively energizing each of said electro responsive valve means to condition the corresponding stages of the distributing valve means for the application of the corresponding electrically driven means, and other pilot controlled means for selectively energizing the electrically driven means to distribute operating fluid to the corresponding fluid motor.

2. The tower of claim 1 wherein said distributing valve means includes means for selectively reversing the flow of operating fluid to each of the fluid motors in response to the direction of application of the corresponding electrically driven means and wherein said other pilot controlled means includes means for selectively reversing the direction of application of each electrically driven means to the corresponding stage of the distributing valve means.

3. The tower of claim 2, wherein said last-mentioned means includes means for limiting the energization of each electrically driven means to a predetermined movement in each direction.

4. In an aerial tower having a movable member and a fluid actuated motor for moving the member, a control system comprising, a variable pressure source of operating fluid, normally closed distributing valve means for directing operating fluid from said source to the fluid actuated motor, normally isolated electro-responsive means for controlling the flow of fluid through said distributing valve means, normally inactive fluid actuated means for selectively applying said electro-responsive means to said distributing valve means, electro-responsive valve means for directing operating fluid from said source to said fluid actuated means, fluid responsive means for changing the output pressure of said source to a predetermined operating level, means normally by-passing said distributing valve means and said electro-responsive valve means and said fluid responsive means with operating fluid from said source, other electro-responsive means for rendering said by-passing means inactive and thus providing for supplying fluid to said distributing valve means and said electro-responsive valve means and said fluid responsive means, and pilot control means for selectively energizing each of said electro-responsive means and said electro-responsive valve means to activate said fluid motor.

5. The apparatus and control system of claim 4 wherein the tower has a plurality of relatively movable members and a plurality of fluid actuated motors for independently moving each of the tower members and wherein the elements of the control system are duplicated for each fluid actuated motor, the duplicate control systems being coupled together in parallel relation for connection to common sources of operating fluid and electrical energy.

6. The apparatus and control system of claim 4 wherein said distributing valve means includes normally operable auxiliary control means for opening the distributing valve means independent of said pilot controlled means, said control means including switch means for energizing said other electro-responsive means while disabling said pilot controlled means.

7. In a mobile aerial tower having a fluid actuated tower positioning motor, a control system comprising, a variable pressure source of operating fluid having a supply and a return conduit, a distributing valve having an inlet and discharge and spaced distributing ports for supplying and returning operating fluid to and from the fluid motor, branch conduits connecting the distributing valve inlet and discharge to the supply and return conduits respectively, a slide valve member adapted to be positioned in said distributing valve to control the flow to the fluid motor, an electrical motor having a drive shaft, a fluid actuated clutch for operably coupling the drive shaft to reciprocate the slide valve member, a branch conduit connecting the clutch to the supply conduit, a normally closed solenoid operated valve in the clutch branch conduit, a fluid responsive device for increasing the operating fluid pressure at the source and having an inlet connected to the supply conduit, a by-pass conduit for connecting the source output directly to the return conduit, another solenoid operated valve normally connecting the by-pass conduit directly to the source and isolating the supply conduit from the source and adapted when energized to isolate the by-pass conduit from and connect the supply conduit to the source, and pilot controlled means for selectively energizing said electrical motor and each of said solenoid operated valves to activate the fluid motor.

8. The aerial tower control system of claim 7 wherein said pilot controlled means includes a plurality of normally open relay switches each having a relay coil, circuit means for independently connecting said electrical motor and each of said solenoid operated valves across a source of electrical energy through a corresponding normally open relay switch, and other circuit means including a manually operable switch for independently connecting each relay coil across a source of electrical energy respectively.

References Cited in the file of this patent

UNITED STATES PATENTS

| | | |
|---|---|---|
| 2,412,006 | Pedersen | Dec. 3, 1946 |
| 2,450,152 | Miller | Sept. 28, 1948 |
| 2,595,414 | Schaefer | May 6, 1952 |
| 2,611,246 | Ackermann | Sept. 23, 1952 |
| 2,620,824 | Slomer | Dec. 9, 1952 |
| 2,627,560 | Eitel | Feb. 3, 1953 |
| 2,641,342 | Hasbrouck | June 9, 1953 |
| 2,643,515 | Harsch | June 30, 1953 |
| 2,690,192 | Dannhardt | Sept. 28, 1954 |
| 2,759,459 | Lucien | Aug. 21, 1956 |
| 2,768,499 | Pilch | Oct. 30, 1956 |
| 2,786,723 | Harsch | Mar. 26, 1957 |
| 2,815,250 | Thornton-Trump | Dec. 3, 1957 |
| 2,843,093 | Vltavsky | July 15, 1958 |